United States Patent
Peters et al.

[11] 3,922,311
[45] Nov. 25, 1975

[54] FLUORODINITROETHYL DIFLUOROFORMAL AND PROCESS OF MANUFACTURE

[75] Inventors: Howard M. Peters, Palo Alto; Robert L. Simon, Jr., San Carlos, both of Calif.

[73] Assignee: The United States of America as represented by the United States Energy Research and Development Administration, Washington, D.C.

[22] Filed: May 10, 1972

[21] Appl. No.: 251,878

[52] U.S. Cl............ 260/615 A; 149/88; 260/463; 260/644; 252/182; 252/405
[51] Int. Cl.$^2$........................... C07C 43/30
[58] Field of Search................... 260/615 A

[56] References Cited
UNITED STATES PATENTS

| | | | |
|---|---|---|---|
| 3,291,833 | 12/1966 | Gold et al.............. | 260/615 A X |
| 3,388,147 | 6/1968 | Kamlet et al........... | 260/615 A X |
| 3,431,290 | 3/1969 | Hall..................... | 260/476 R X |
| 3,541,160 | 11/1970 | Kamlet.................. | 260/615 A |
| 3,542,884 | 11/1970 | Adolph.................. | 260/615 A X |
| 3,629,338 | 12/1971 | Martin................... | 260/615 A |
| 3,705,197 | 12/1972 | Kaplan et al............ | 260/615 A |

OTHER PUBLICATIONS
Aldrich et al., J. Org. Chem., 29, 11–15, 1964.
Shipp et al., J. Org. Chem., 31, 853–856, 1966.

*Primary Examiner*—Howard T. Mars
*Attorney, Agent, or Firm*—John A. Horan; Frederick A. Robertson; Irene S. Croft

[57] ABSTRACT [1]

Bis(2-fluoro-2,2-dinitroethyl) difluoroformal (difluoro-FEFO) is prepared by reacting bis(2-fluoro-2,2-dinitroethyl) carbonate with $SF_4$ and HF according to the reaction

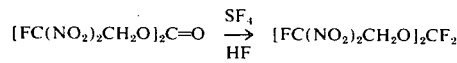

and recovering the product. An alternative procedure for producing the compound as well as procedures for producing the starting materials are also disclosed. The compound is a highly energetic material especially suited for use in explosive compositions.

1 Claim, No Drawings

FLUORODINITROETHYL DIFLUOROFORMAL AND PROCESS OF MANUFACTURE

BACKGROUND OF THE INVENTION

The invention disclosed herein was made under or in the course of Contract No. AT(04-3)-115, Project Agreement No. 85 with the United States Atomic Energy Commission.

Plastic bonded explosives, often referred to as PBX, are widely used in military and civilian applications. Such an explosive composition generally comprise a suitable explosive such as HMX, RDX, etc., in particle sizes in the range of about 2 to 30 microns dispersed in a suitable explosively energetic fluid phase with a thickener such as colloidal silica or together with a suitable plastic binder such as an acrylic resin material and energetic plasticizer which confers a plastic quality which enables it to withstand a mechanical shock or thermal changes without fracturing. A suitable plasticizer may also improve molding properties to facilitate fabrication and should have low volatility, a wide temperature range at which the material remains liquid so as to avoid phase changes which might disrupt the explosive, i.e., a low glass transition temperature, and desirably to contribute to the explosive energy of the PBX composition. Certain glycol esters of difluoronitroacetic acid which have been used in such compositions are disclosed in U.S. Pat. No. 3,267,134, issued Aug. 16, 1966 to Eugene R. Bissell. Moreover, U.S. Pat. No. 3,480,490 issued Nov. 25, 1969 to Milton Finger et al, discloses an extrudable plastic explosive composition comprising RDX or HMX in amounts of about 50 to 75% by weight in particles of about 2 to 30 microns, 15–25 microns preferred. Colloidal silica of the order of 2% by weight and/or up to a few percent of acrylate ester compounds with a cross-linking agent and the remainder comprising an energetic plasticizer or dispersant vehicle to formulate the composition. The plasticizers disclosed therein include liquid explosives of the gem-dinitro aliphatic hydrocarbon class, a particularly useful one being 2-fluoro-2,2-dinitrofluoroethyl formal (FEFO).

The synthesis of certain difluoroformals using sulfur tetra-fluoride and hydrogen fluoride maintained at temperatures of about 200° to 250°C for 10 hours has been reported by Aldrich and Sheppard, J. Org. Chem., 29,11 (1964).

SUMMARY OF THE INVENTION

The present invention relates to fluorodinitroethyl-difluro-formals and to processes for producing same.

The starting material bis(2-fluoro-2,2-dinitroethyl) carbonate is preferably prepared by dissolving about 10 to 20 mole percent excess of phosgene in methylene chloride and one equivalent of pyridine in a separate portion of methylene chloride. These two solutions are then added to a dry solution of one equivalent of 2-fluoro-2,2-dinitroethanol in methylene chloride in such a manner that phosgene is always present in excess of the pyridine. The reaction which occurs is as follows:

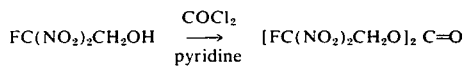

The crude product is separated from the reaction mixture and is purified as by recrystallization and is generally handled as a methylene chloride solution.

For preparing bis(2-fluoro-2,2-dinitroethyl)difluoroformal (difluoro-FEFO) the foregoing solution may be deposited in an autoclave and the solvent removed by evaporation under vacuum. Then the requisite amount of SF$_4$ and anhydrous hydrogen fluoride may be condensed therein at low temperature. The autoclave is then sealed and heated to a temperature of about 95°–125°C for an extended period of time whereupon the following reaction occurs:

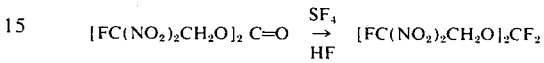

The crude product, a cloudy amber liquid in methylene chloride may be purified by successively washing with NaHCO$_3$ solution, contacting with Hg to remove sulfur impurities and decolorizing with Norit.

The final product may then be used as a highly energetic plasticizer in compounding PBX formulations similarly to those described above thereby providing superior formulations which retain appropriate plastic and other properties and have superior storage and over wide temperature ranges as well as being somewhat more energetic.

Accordingly, it is an object of the invention to provide a novel fluorodinitroethyl difluoroformal and process for manufacturing same.

Another object of the invention is to provide an energetic plasticizer or fluidic dispersant material for formulating plastic explosive compositions.

Still another object of the invention is to provide bis(2-fluoro-2,2-dinitroethyl) difluoroformal for use in formulating PBX compositions.

Other objects and advantageous features of the invention will be apparent in the following description.

DESCRIPTION OF THE INVENTION

BIS(2-FLUORO-2,2-DINITROETHYL)CARBONATE

This material can be prepared by the method disclosed by T. N. Hall, U.S. Pat. No. 3,431,290 issued Mar. 4, 1969 by reaction of fluorodinitroethyl alcohol with COCl$_2$ in pyridine. However, monitoring of the toxic phosgene gas in this reaction is difficult as is working up of the product. Moreover, the product is obtained in relatively low yields. The process described hereinafter with reference to particular examples is preferred.

EXAMPLE I

Dry solutions of phosgene (154 g, 1.56 mol, about 25 mole % excess equivalent) in methylene chloride (600 ml) and pyridine (206 g, 2.60 mol, one equivalent) in methylene chloride (400 ml) were added simultaneously over 15 min to a mechanically stirred, precooled (15°C) solution of fluorodinitroethanol (FDNE) (400 g, 2.60 mol, one equivalent) in methylene chloride (1600 ml). Approximately 100 ml of phosgene solution was added, after which the remaining phosgene solution was added simultaneously with the pyridine solution. The reaction temperature was kept at 25°–30°C with ice-bath cooling. The cooling bath was removed when the temperature dropped to 22°C, about 5 min after completing the additions. Pyridinium hydrochloride began to precipitate at this time. The reaction mixture was stirred 2.5 hr at 22°–24°C, then concentrated to ca. 1500 ml at aspirator pressure using a 40°C water bath. Water (500 ml) was added to the resulting solidified mass. Two liquid phases formed with nonexothermic gas evolution. The organic phase (lower) was separated and divided in half for safety reasons for the following purification steps: Both solutions were washed with water (2 × 250 ml), dried over magnesium sulfate, filtered, and evaporated at water pump pressure leaving a crystalline product under solvent. The combined weight of crude products was 321 g, 74% of theory based on 100% fluorodinitroethanol. Both batches of crude product filtered from the solution were recrystallized from 75% (vol) 3:1 chloroform:hexane (1 ml/g crude product). The dark mother liquor was decanted and the cold, white crystals were washed free of color with cold (50%) 1:1 chloroform:hexane. Both batches of solvent-wet recrystallized carbonate were immediately dissolved in methylene chloride for storage. Small aliquots were evaporated for analysis: Crop 1, 218.6 g, mp 44.0°–44.5°C. A second crop was obtained by concentrating the mother liquor: Crop 2, 33.5 g, mp 44°–45°C. The total yield, 252 g (58%); ir (neat, melt) 3000 (w, CH), 1800 (s, C=O), 1620 (s, $NO_2$), 1450 (m), 1400 (m), 1330 (s, $NO_2$), 1275 (sb, CF, C—O), 1125 (m, C—O), 1000 (m, C—O), 850 (m), 800 (m), and 780 (m) $cm^{-1}$.

Water was removed from methylene chloride used in the reaction as an azeotrope by distilling until a constant boiling point was reached. Similarly, fluorodinitroethanol was dried by trapping out water from a boiling methylene chloride solution. Dry reagent quality pyridine was used from freshly opened bottles. All materials were protected from moisture with tubes of Drierite.

The foregoing example is included as Run No. 4 in the following Table I in which the data of three other runs are included.

(about 70%) the use of an excess of 25 molar % of pyridine relative to the FDNE is considered to have reduced the attainable yields. The reaction is only mildly exothermic and presented no difficulties in scaling to larger size batches. Some variation in the concentrations of reagents in the solvent can certainly be tolerated and different chlorinated solvents might be used.

As a safety precaution, the carbonate was kept in the solution during all stages except for the following operations:

1. Removal of the methylene chloride for recrystallization of the carbonate from chloroform/hexane. For safety reasons, this step was performed on ca. 100 g batches. Preliminary work on the recrystallization of carbonate from 60 vol % methylene chloride/hexane (1 ml/g) indicates that this solvent system might be useful for eliminating the isolation of the carbonate prior to recrystallization.

2. Recrystallization of the carbonate. During this operation the carbonate (100 g batches) was kept wet during the removal of colored impurities using cold solvent, and then dissolved in methylene chloride. A small aliquot was evaporated for the determination of yield and physical constants. Subsequent work indicated that the recrystallization step can be eliminated if purified FDNE is used. Distilled FDNE (22 g) was converted to yellow, crystalline carbonate (16 g) that melted at 25°–37°C. The carbonate was purified as a methylene chloride solution with saturated sodium bicarbonate and water washes, followed with drying over magnesium sulfate, and treating with Norit. The resulting pale yellow carbonate (14 g, 62% yield) melted at 39°–43°C, which indicates sufficient purity for conversion to the formula. The properties of bis(2-fluoro-2,2-dinitroethyl) carbonate are given in Table II.

TABLE II

| PROPERTIES OF BIS(2-FLUORO-2,2-DINITROETHYL)CARBONATE | |
|---|---|
| Structure: | 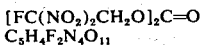 |
| Molecular Formula: | $C_5H_4F_2N_4O_{11}$ |

TABLE I

PREPARATION OF BIS(2-FLUORO-2,2-DINITROETHYL)CARBONATE
2 $FC(NO_2)_2CH_2OH$ + $COCl_2$ $\xrightarrow{Pyridine}$ $[FC(NO_2)_2CH_2O]_2 C=O$ + HCl

| Run No. | FDNE* in $CH_2Cl_2$ | | | $COCl_2$ in $CH_2Cl_2$ | | | Pyridine in $CH_2Cl_2$ | | | Time (hr) |
|---|---|---|---|---|---|---|---|---|---|---|
| | g | (mole) | ml | g | (mole) | ml | g | (mole) | ml | |
| 1 | 200 | (1.3) | 800 | 78 | (0.79) | 385 | 103 | (1.3) | 385 | 1.5 |
| 2 | 300 | (1.95) | 1200 | 117 | (1.18) | 585 | 155 | (1.95) | 585 | 21.0 |
| 3 | 400 | (2.6) | 1600 | 154 | (1.56) | 600 | 206 | (2.6) | 405 | 2.5 |
| 4 | 400 | (2.6) | 1600 | 154 | (1.56) | 600 | 206 | (2.6) | 400 | 2.5 |

| Yield | | | | Corrected[a] | |
|---|---|---|---|---|---|
| Crude | | Pure | | Crude | Pure |
| g | % | g | % | % | % |
| 149 | 69 | 126 | 58 | 86 | 73 |
| 239 | 74 | 161 | 50 | 92 | 62 |
| 328 | 75 | 248 | 57 | 95 | 71 |
| 321 | 74 | 252 | 58 | 92 | 73 |

[a]FDNE assayed at 80 wt % changing moles of FDNE used in runs 1–4 to 1.04, 1.56, 2.08, and 2.08, respectively. The corrected percent yields are given.

It may be noted that about 10 to 20% excess of phosgene dissolved in methylene chloride generally suffices under process conditions although, in theory, only about one equivalent, i.e., about 0.5 mole $COCl_2$ is actually needed in the reaction. The FDNE used in the reactions contained about 18% volatile impurities of which 95% was ethyl acetate and 2% a nondistillable amber residue. Although the pure yields are quite high

| | |
|---|---|
| Molecular Weight: | 334.1 |
| Appearance: | White needles from chloroform/hexane |
| Melting Point: | 44.0 – 44.5°C |
| Impact Sensitivity*: | 42 kg-cm |
| Vacuum Thermal Stability*: | 0.1 cc/g/48 hr at 100°C |

*M. J. Kamlet, K. G. Shipp, and M. E. Hill, U.S. Pat. No. 3,388,147 June 11, 1968.

BIS(2-FLUORO-2,2-DINITROETHYL)DIFLUOROFORMAL (DIFLUORO-FEFO)

A methylene chloride solution of bis(2-fluoro-2,2-dinitroethyl) carbonate (250 g. 0.75 mol) was poured into a 1000-ml autoclave. The methylene chloride was evaporated by the aid of a nitrogen stream followed by evacuation to 100 μ Hg. Sulfur tetrafluoride (263 g, 2.44 mol) followed by anhydrous hydrogen fluoride (110 g, 5.5 mol) was condensed into the evacuated autoclave at −78°C. The autoclave was sealed and heated at 106°–120°C (450–510 psig autogenous pressure) for 212 hr in a rocking assembly. The reaction pressure was reduced below atmospheric with Dry Ice cooling and the gases were vented through aqueous sodium hydroxide as the autoclave warmed to ambient temperature. The content, dissolved in 200 ml of methylene chloride (Baker Instra-Analysed reagent), was poured onto a stirred suspension of sodium fluoride (100 g) in methylene chloride (50 ml). After stirring 1.5 hr at ambient temperature, the mixture was filtered and a small aliquot of the amber solution was evaporated for analyses of the neat, crude product. Crude yield was 262 g (98.1%) of cloudy, amber liquid.

The crude product was purified in the following three steps:

1. Most of the color was removed by washing the methylene chloride solution (400 ml) with saturated sodium bicarbonate (3 × 200 ml). The washed solution was dried over magnesium sulfate and filtered.

2. Sulfur-containing impurities were removed by stirring the solution over mercury until the formation of black sulfides of mercury ceased. The black precipitate was periodically removed by suction filtration through a Celite pad: 100 g Hg, 22 hr; 450 g Hg, 5 hr; and 450 g Hg, 17 hr (to give a clear solution).

3. Last traces of color were removed by boiling the solution 5 min with 2 g of decolorizing charcoal (Norit) and filtering. A small aliquot of the solution was evaporated for analysis as bis-(2-fluoro-2,2-dinitroethyl) difluoroformal: 243.6 g in 91.2% yield; glpc 98.9% pure with 0.7% bis(2-fluoro-2,2-dinitroethyl)carbonate; $n^{25.4}D$ 1.4138; very pale yellow liquid; ir (neat) 3000 (w, CH), 1600 (s, $NO_2$), 1450 (m), 1400 (m), 1300 (s, $NO_2$), 1240, 1200 and 1060 (sb, CF and C—O), 1000 (m, C—O), 850 (m), 800 (m), 790 (m), and 780 $cm^{-1}$ (w); nmr ($CDCl_3$) δ 5.00 ppm (d, $J_{HF}$ = 16 Hz).

Data relating to the foregoing run identified as Run 4 together with that of several other runs are given in Table III which follows:

TABLE III

PREPARATION OF BIS(2-FLUORO-2,2-DINITROETHYL)DIFLUOROFORMAL $$[FC(NO_2)_2CH_2O]_2C=O + SF_4 \xrightarrow[100-105°C]{HF} [FC(NO_2)_2CH_2O]_2CF_2$$

| Run No. | Carbonate g | (mole) | SF₄ g | (mole) | HF g | (mole) | Time (hr) | Temperature °C corrected | Pressure psig |
|---|---|---|---|---|---|---|---|---|---|
| 1ª | 100 | (0.30) | 169 | (1.56) | 62 | (3.1) | 109 | 100 – 120 | 360 – 490 |
| 2ᵇ | 150 | (0.45) | 189 | (1.75) | 180 | (9.0) | 135 | 105 – 110 | 360 – 400 |
| 3ᶜ | 200 | (0.60) | 243 | (2.25) | 96 | (4.8) | 135 | 95 – 120 | 390 – 580 |
| 4ᵈ | 250 | (0.75) | 263 | (2.44) | 110 | (5.5) | 212 | 106 – 120 | 420 – 510 |

| Yield Crude g | % | Pure g | % | Impurityᵉ % |
|---|---|---|---|---|
| 103 | 96 | 100 | 94 | 0.9 |
| 153 | 96 | 142 | 89 | 0.0 |
| 206 | 96 | 194 | 91 | 1.4 |
| 262 | 98 | 244 | 91 | 0.7 |

ª110°C for 89 hr, 360–430 psig; then 120°C for 22 hr, 490 psig. Brown fumes, probably $NO_2$, were evolved when the reactor was opened.
ᵇTemperature would drop 5°C at night. No brown fumes were observed.
ᶜ95–105°C for 120 hr, 390–480 psig; then 115–120°C for 15 hr at 550–580 psig. Brown fumes, probably $NO_2$ were observed when the reactor was opened.
ᵈNo brown fumes were observed.
ᵉUnreacted bis(2-fluoro-2,2-dinitroethyl)carbonate remaining in purified difluoro-FEFO as determined by glpc.

TABLE IV

PROPERTIES OF BIS(2-FLUORO-2,2-DINITROETHYL)DIFLUOROFORMAL

| | |
|---|---|
| Structure: | $[FC(NO_2)_2CH_2O]_2CF_2$ |
| Molecular Formula: | $C_5H_4F_4N_4O_{10}$ |
| Molecular Weight: | 356.1 |
| Appearance: | Very pale yellow liquid |
| Boiling Point: | 70°C (3 μ) |
| Refractive Index: | 1.4138 (25.4°C) |
| Reported: | 1.4129 (27°C) |
| Density: | 1.67 (27°C) |
| Nmr ($CDCl_3$): | TMS reference |

| Chemical Shift | Assignment | J, Hz |
|---|---|---|
| δ 5.00 doublet | $CH_2$ | 16 |

| Analyses: | Calculated | Found |
|---|---|---|
| C | 16.86 | 16.82 |
| H | 1.13 | 1.28 |
| F | 21.34 | 21.15 |
| N | 15.74 | 16.02 |

Vapor Pressure (Knudsen Transport method): 1.6 μ (25°C)
Impact Sensitivity: neat = $H_{50\%}$ 44–45 cm/3 kg
25% solution in $CH_2Cl_2$ = Negative at upper limit of apparatus It may be noted that the upper limit of the range, about 95°–125° is that at which best yields are obtainable as at temperatures as high as 150°C yields decrease and byproduct production increases. The concentration of reactants in the methylene chloride solvent may, of course, be varied considerably so that those indicated above are to be considered to be illustrative and not as limitative. Mole ratios of carbonate: $SF_4$: HF of the order of about 1:2.5:6 to about 1:6:25, respectively, may be used. Those used in the examples above range from about 1:3 to 5:8 to 20.

The properties of difluoroformal FEFO are compared with those of FEFO in Table 5. In formulating explosive compositions the two compounds are substantially interchangeable on a 1:1 basis. However, the difluoroformal compound can be seen to possess significantly improved properties.

TABLE 5

Properties of bis(fluorodinitroethyl) difluoroformal

| Property | Difluoroformal | FEFO |
|---|---|---|
| Melting point (°C) | −16.5 | +14 |
| Boiling Point (°C/mm) | 83/0.3 | 110/0.3 |
| Vapor pressure at 25°C($\mu$) | 1.6 | 0.2 |
| Density (g/cc) | 1.67 | 1.60 |
| $n_D^{27}$ | 1.4129 | |
| Chemical reactivity (22 hr/120°) | 0.04 | 0.06 |
| Relative energy (Kamlet calc) | 1.04 | 1.00 |

Initial work on the purification of difluoro-FEFO in solution showed that washing with saturated sodium bicarbonate removed most of the colored impurities, and treatment with Norit removed the remaining color. Distillation (for analysis purposes) of a sample (15.7 g) treated in this manner produced only 10 milligrams of nondistillable amber residue. Therefore, bicarbonate wash and Norit treatment were sufficient to remove virtually all nonvolatile impurities. However, the two purification steps, as well as distillation, failed to remove a very fine, pale yellow solid impurity detected in chilled, neat samples. This impurity was presumed to be a sulfur-containing material and was effectively removed by stirring the methylene chloride solution over mercury until a black precipitate no longer formed (about 2 days). The major impurity detected by glpc was unreacted carbonate, ca. 1%, in Runs 1, 3, and 4.

Impact Sensitivity Tests

Difluoro-FEFO was shown to be relatively insensitive to impact with 50% probability of detonation using a 3-kg weight dropped from 44–45 cm. In contrast and as a standard, FEFO was found to give 50% probability of detonation with a 1-kg weight from only 5–6 cm. The 25% solution of difluoro-FEFO in methylene chloride could not be detonated in 15 trials at the upper operating limit of the apparatus, i.e., 45 cm-3 kg. Greater height and/or weight would simply result in rupture of the metal diaphragm by fluid compression instead of detonation. These tests may be taken to indicate that said 25% solution is sufficiently safe for shipping. The test results are summarized in Table 6.

TABLE 6

IMPACT SENSITIVITY TESTS WITH TECHNOPRODUCTS DROP-WEIGHT TESTER
30 $\mu$l Samples

| Compound | $H_{50\%}$, cm | Wt,kg |
|---|---|---|
| I. [FC(NO$_2$)$_2$CH$_2$O]$_2$CF$_2$: | | |
| 1. Neat (Lot No. 2) | 44–45 | 3 |
| 2. 25 wt % in CH$_2$Cl$_2$ | Negative[a] | 3 |
| II. [FC(NO$_2$)$_2$CH$_2$O]$_2$CH$_2$(standard)[b] | 5–6 | 1 |
| III. Ethyl Nitrate (standard)[c] | 1–2 | 1 |

[a]Negative with 15 trials at upper operating limit of apparatus: 45 cm — 3 kg.
[b]In agreement with results from SRI Project 6245, 3 cm — 1 kg.
[c]In agreement with published value, 2 kg-cm, in Technoproducts Data Bulletin No 66830, "Drop-Weight Tester".

While there has been described in the foregoing what may be considered to be preferred embodiments of the invention, modifications may be made therein without departing from the teachings of the invention and it is intended to cover all such as fall within the scope of the appended claims.

What we claim is:
1. The compound bis(2-fluoro-2,2-dinitroethyl) difluoroformal.

* * * * *